(12) United States Patent
Collie et al.

(10) Patent No.: US 10,393,034 B2
(45) Date of Patent: Aug. 27, 2019

(54) FUEL SYSTEM FOR A MULTI-FUEL INTERNAL COMBUSTION ENGINE

(71) Applicant: Champion Engine Technology, LLC, Sussex, WI (US)

(72) Inventors: Kendall J. Collie, Anaheim Hills, CA (US); Mark J. Sarder, Waukesha, WI (US); Aleko D. Sotiriades, Cedarburg, WI (US); James J. Dehn, Brookfield, WI (US); Leigh Jenison, Hartland, WI (US)

(73) Assignee: Champion Power Equipment, Inc., Santa Fe Springs, CA (US)

( * ) Notice: Subject to any disclaimer, the term of this patent is extended or adjusted under 35 U.S.C. 154(b) by 30 days.

(21) Appl. No.: 15/285,215

(22) Filed: Oct. 4, 2016

(65) Prior Publication Data

US 2017/0022910 A1    Jan. 26, 2017

Related U.S. Application Data

(63) Continuation-in-part of application No. 14/925,441, filed on Oct. 28, 2015, which is a continuation-in-part of application No. 14/738,060, filed on Jun. 12, 2015.

(51) Int. Cl.
*F02D 19/06* (2006.01)
*F02M 19/06* (2006.01)
(Continued)

(52) U.S. Cl.
CPC .......... *F02D 19/0613* (2013.01); *F02B 43/00* (2013.01); *F02B 63/04* (2013.01);
(Continued)

(58) Field of Classification Search
CPC ............ F02D 41/0025; F02D 41/0027; F02D 19/0647; F02D 19/081; F02D 19/0613;
(Continued)

(56) References Cited

U.S. PATENT DOCUMENTS 2,722,208 A    11/1955   Conroy, Jr. et al.
3,384,059 A    5/1968    Kopa
(Continued)

FOREIGN PATENT DOCUMENTS

CN    2060477 U    8/1990
CN    1981121 A    6/2007

OTHER PUBLICATIONS

Honda EU20i LPG, Mar. 20, 2012, https://www.youtube.com/watch?v=yBpq33aJmR0.
(Continued)

*Primary Examiner* — Long T Tran
(74) *Attorney, Agent, or Firm* — Ziolkowski Patent Solutions Group, SC

(57) ABSTRACT

A multi-fuel engine includes an engine operable on a liquid fuel and a gaseous fuel. The multi-fuel engine also includes a liquid cutoff solenoid coupled to open and close a liquid fuel path to the engine, and a gaseous cutoff solenoid coupled to open and close a gaseous fuel source to the engine. A switch couples a power source to the liquid cutoff solenoid and the gaseous cutoff solenoid to switch between fuel sources on-the-fly during engine operation.

24 Claims, 4 Drawing Sheets

(51) Int. Cl.
    *F02B 63/04*     (2006.01)
    *F02M 19/08*     (2006.01)
    *F02M 13/08*     (2006.01)
    *F02B 43/00*     (2006.01)
    *F02D 29/06*     (2006.01)
    *F02D 41/06*     (2006.01)
    *F02N 3/02*      (2006.01)
    *F02D 41/00*     (2006.01)

(52) U.S. Cl.
    CPC ..... *F02D 19/0647* (2013.01); *F02D 19/0678* (2013.01); *F02D 19/0681* (2013.01); *F02D 29/06* (2013.01); *F02M 13/08* (2013.01); *F02M 19/06* (2013.01); *F02M 19/08* (2013.01); *F02D 41/0025* (2013.01); *F02D 41/062* (2013.01); *F02N 3/02* (2013.01); *Y02T 10/32* (2013.01); *Y02T 10/36* (2013.01)

(58) Field of Classification Search
    CPC .. F02D 19/08; F02D 19/105; F02B 2043/103; F02B 2201/06; F02B 2201/064
    See application file for complete search history.

(56) References Cited

U.S. PATENT DOCUMENTS

| | | | |
|---|---|---|---|
| 3,412,258 A | 11/1968 | Satter | |
| 3,659,574 A | 5/1972 | Reschke et al. | |
| 3,718,000 A * | 2/1973 | Walker | F02B 11/02 123/525 |
| 3,783,849 A * | 1/1974 | Bramfitt | F02M 13/06 123/179.16 |
| 3,888,223 A | 6/1975 | Mondt | |
| 4,335,697 A | 6/1982 | McLean | |
| 4,372,276 A | 2/1983 | Bernhardsson et al. | |
| 4,373,493 A | 2/1983 | Welsh | |
| 4,450,821 A | 5/1984 | Venning et al. | |
| 4,463,735 A | 8/1984 | Stoltman | |
| 4,480,595 A | 11/1984 | Hobby et al. | |
| 4,489,699 A * | 12/1984 | Poehlman | F02B 69/04 123/525 |
| 4,502,453 A | 3/1985 | Kabasin et al. | |
| 4,619,240 A | 10/1986 | Bedford et al. | |
| 4,628,871 A | 12/1986 | Glass | |
| 4,708,094 A | 11/1987 | Helmich et al. | |
| 4,895,124 A | 1/1990 | Bartholomew | |
| 4,979,480 A | 12/1990 | Daikoku et al. | |
| 5,092,305 A | 3/1992 | King | |
| 5,161,496 A | 11/1992 | Matsushima et al. | |
| 5,171,487 A | 12/1992 | Hudz | |
| 5,228,423 A | 7/1993 | Oikawa et al. | |
| 5,287,839 A | 2/1994 | Kondou et al. | |
| 5,320,078 A | 6/1994 | Lorraine | |
| 5,325,835 A | 7/1994 | Kimata et al. | |
| 5,379,740 A | 1/1995 | Moore et al. | |
| 5,419,291 A | 5/1995 | Kimata et al. | |
| 5,438,968 A | 8/1995 | Johnson et al. | |
| 5,450,832 A * | 9/1995 | Graf | F02M 13/08 123/515 |
| 5,611,312 A * | 3/1997 | Swanson | F02M 1/02 123/179.18 |
| 5,673,670 A | 10/1997 | Powell et al. | |
| 5,816,224 A | 10/1998 | Welsh et al. | |
| 6,082,323 A | 7/2000 | Winberg | |
| 6,213,083 B1 | 4/2001 | Winberg | |
| 6,223,730 B1 | 5/2001 | Hasegawa et al. | |
| 6,276,345 B1 | 8/2001 | Nelson et al. | |
| 6,401,685 B1 | 6/2002 | Warner | |
| 6,453,877 B1 | 9/2002 | Lucier et al. | |
| 6,591,817 B2 * | 7/2003 | Deutsch | F02D 19/0647 123/525 |
| 6,914,342 B1 | 7/2005 | French | |
| 7,905,469 B2 | 3/2011 | Nickels et al. | |
| 8,342,158 B2 | 1/2013 | Ulrey et al. | |
| 8,590,510 B2 | 11/2013 | Surnilla et al. | |
| 9,435,273 B2 | 9/2016 | Sarder et al. | |
| 2002/0134362 A1 * | 9/2002 | Deutsch | F02D 19/0647 123/575 |
| 2004/0139943 A1 * | 7/2004 | Kern | F01P 11/16 123/198 D |
| 2007/0137591 A1 * | 6/2007 | Sugimoto | F02B 43/00 123/41.7 |
| 2011/0168133 A1 | 7/2011 | Pursifull et al. | |
| 2013/0047964 A1 | 2/2013 | Kim | |
| 2013/0220274 A1 | 8/2013 | Deshpande et al. | |
| 2014/0202430 A1 | 7/2014 | Monros | |
| 2014/0238340 A1 * | 8/2014 | Dunn | F02M 43/00 123/299 |
| 2014/0373531 A1 * | 12/2014 | Wong | F02B 43/02 60/605.1 |
| 2015/0122230 A1 * | 5/2015 | Sarder | F02D 19/0647 123/525 |

OTHER PUBLICATIONS

Johnson et al., "Electronic Direct Fuel Injection (EDFI) for Small Two-Stroke Engines," SAE Technical Paper 1999-01-3312, Proceedings of the 1999 SAE Small Engine Technology Conference, Madison, WI, Sep. 28-30, 1999, pp. 1-15.

Champion Power (Dec. & Jan. 2014) 100153 Manual, Retrieved from http://www.championpowerequipment.com/media/2400/100153_manual-english_12-4-14.pdf.

* cited by examiner

FUEL SYSTEM FOR A MULTI-FUEL INTERNAL COMBUSTION ENGINE

CROSS-REFERENCE TO RELATED APPLICATION

The present application is a continuation-in-part of and claims priority to U.S. patent application Ser. No. 14/925,441, filed Oct. 28, 2015, which is a continuation-in-part of and claims priority to U.S. patent application Ser. No. 14/738,060, filed Jun. 12, 2015, the disclosures of which are incorporated herein by reference in their entirety.

BACKGROUND OF THE INVENTION

Embodiments of the invention relate generally to dual fuel and other multi-fuel internal combustion engines, and more particularly, to an apparatus and method for delivering liquid fuel and gaseous fuel to a generator driven by a multi-fuel internal combustion engine.

Electric generators are frequently driven by internal combustion engines that use gasoline as a fuel source. Gasoline is a common fuel source for generators in a variety of applications. However, alternative fuel sources also provide a desirable fuel source. For instance, alternative fuels may provide a cleaner burning fuel that limits undesirable emissions. Alternative fuels may also be stored for longer periods of time without degradation, whereas gasoline can degrade over a period of months leading to hard starting, rough running, and also lead to gum and varnish deposits in the fuel system. In addition, generators that operate on alternative fuels are able to generate electricity when gasoline is not readily available. For instance, generators are frequently used when power outages in the utility grid result from severe weather. Unfortunately, gas stations may also be closed as a result of the power outage. Such a circumstance presents just one example where it would be advantageous to operate electric generators on alternative fuels.

Certain generators are configured to operate as "dual fuel" generators, otherwise known as bi-fuel generators. These generators are driven by an internal combustion engine that is configured to operate on either liquid fuel or an alternative fuel. The alternative fuel may exist in a gaseous state at normal temperature and pressure and can be any one of liquefied petroleum gas, compressed natural gas, hydrogen, or the like. Liquefied petroleum gas (LPG), often referred to as propane, exists in a gaseous state at normal temperature and pressure but can be conveniently stored under pressure in a liquid state. LPG may be a desirable fuel source for internal combustion engines because it can be stored for extended periods of time and contains fewer impurities than gasoline, resulting in smoother and cleaner operation. In addition, propane fueled engines typically have a longer life cycle due to less carbon build-up and virtually no fuel gumming or varnish accumulation.

In order to provide the liquid and gaseous fuel to the engine, the dual fuel engine may have a first fuel line for liquid fuel and a second fuel line for gaseous fuel. A liquid fuel source and a gaseous fuel source may be coupled to the respective lines to provide fuel to the engine. However, a common problem with such configurations that couple two fuel sources to a single fuel inlet, such as a carburetor, of an engine is that during cross-over switching between the fuel sources the engine can experience overly rich air-fuel ratio. This is particularly problematic when switching from a liquid fuel to a gaseous fuel because carburetors have a fuel bowl containing fuel that is drawn into the engine even after the liquid fuel source is cut-off. Therefore, for a period of time, the engine is running on both liquid and gaseous fuels causing an overly rich fuel mixture. Further, such simultaneous delivery of fuel from the first fuel line and the second fuel line, even if for a brief time, may make the engine hard to start and lead to unstable operating conditions.

Therefore, it would be desirable to design a generator having a liquid fuel and gaseous fuel delivery system that overcomes the aforementioned detriments without substantially increasing the overall cost of the system.

BRIEF DESCRIPTION OF THE INVENTION

In accordance with one aspect of the invention, a multi-fuel engine includes an engine operable on a liquid fuel and a gaseous fuel. The multi-fuel engine also includes a liquid cutoff solenoid coupled to open and close a liquid fuel path to the engine, and a gaseous cutoff solenoid coupled to open and close a gaseous fuel source to the engine. A switch couples a power source to the liquid cutoff solenoid and the gaseous cutoff solenoid to switch between fuel sources on-the-fly during engine operation.

In accordance with another aspect of the invention, a multi-fuel generator and fuel delivery system includes a multi-fuel internal combustion engine configured to operate on a liquid fuel supplied from a liquid fuel source through a liquid fuel line and a gaseous fuel supplied from a pressurized fuel source through a gaseous fuel line, and further includes an alternator driven by the multi-fuel internal combustion engine. The multi-fuel generator and fuel delivery system also has a fuel regulator system and an electro-mechanical valve system. The fuel regulator system includes a primary pressure regulator coupled to a service valve of the pressurized fuel source to regulate fuel supplied from the pressurized fuel source to a reduced pressure, and a secondary pressure regulator coupled to the primary pressure regulator to regulate fuel supplied from the primary pressure regulator to a desired pressure for delivery through the gaseous fuel line to operate the engine. The electro-mechanical valve system couples to the engine and operates by an electrical switch powered by one of the alternator, a battery, and a magneto to control fuel flow to the engine from the liquid fuel source and the pressurized fuel source.

In accordance with yet another aspect of the invention, a multi-fuel internal combustion engine includes an engine operable on liquid fuel supplied through a liquid fuel line from a liquid fuel source and gaseous fuel supplied through a gaseous fuel line from a pressurized fuel source, and a switch to change operation of the engine from liquid fuel to gaseous fuel and from gaseous fuel to liquid fuel while the engine is running. A liquid fuel cutoff solenoid couples to control fuel flow through the liquid fuel line and engage engine operation on liquid fuel upon actuation of the switch from gaseous fuel to liquid fuel, and a gaseous fuel cutoff solenoid couples to control fuel flow through the gaseous fuel line and engage engine operation on gaseous fuel upon actuation of the switch from liquid fuel to gaseous fuel.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a multi-fuel generator. However, it will be appreciated by those skilled in the art that the invention is equally applicable for use with any multi-fuel internal combustion engine. Moreover, the invention will be described with respect to a dual fuel or other multi-fuel generator configured to operate on liquid fuel and gaseous fuel. However, one skilled in the art will further appreciate that the invention is equally applicable for use with other fuel combinations for multi-fuel generators and internal combustion engines.

Figure 1:
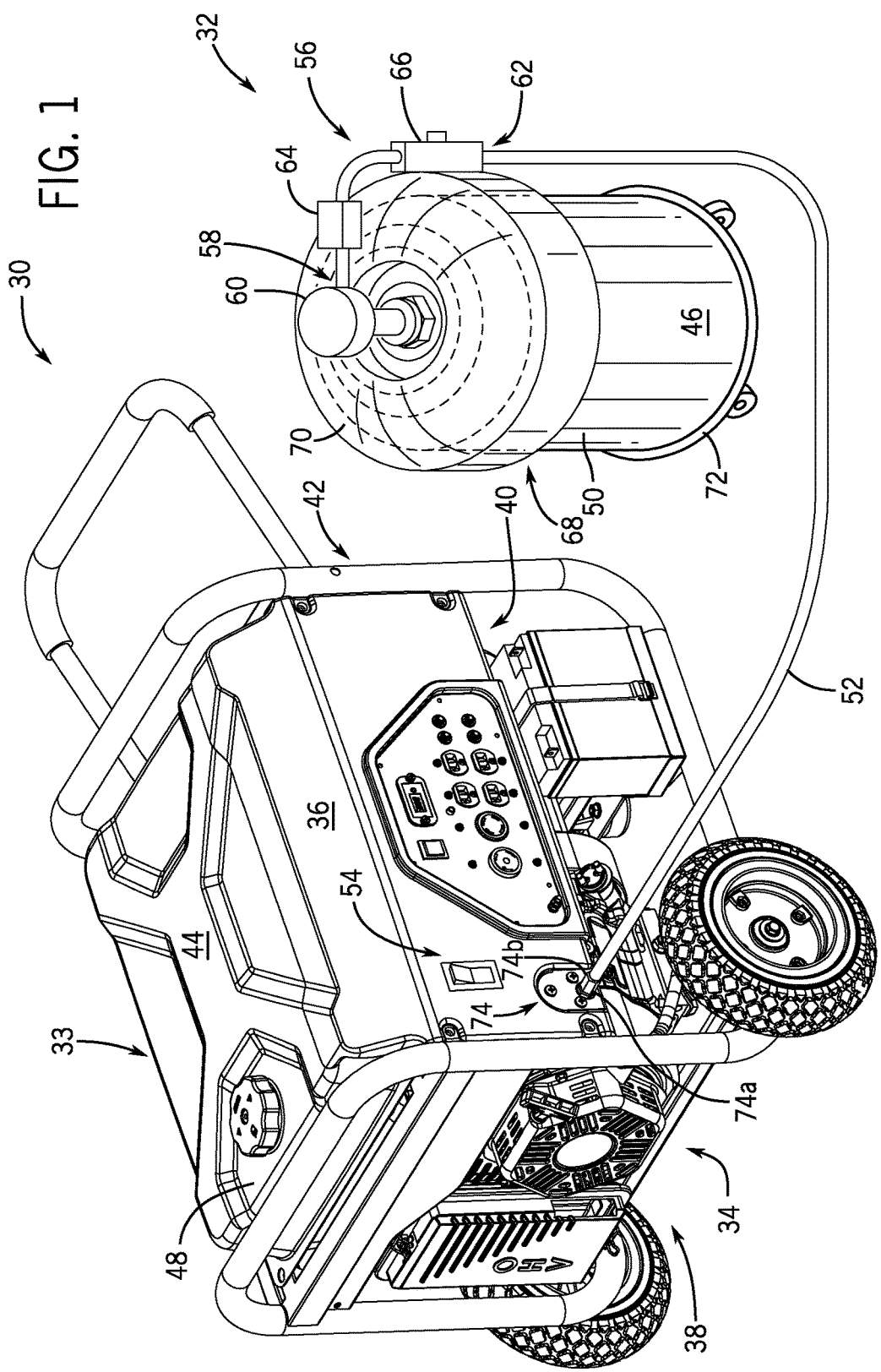
FIG. 1 is a perspective view of a multi-fuel generator coupled to a fuel delivery system, according to an embodiment of the invention.

Referring to FIG. 1, a dual fuel generator 30 is coupled to fuel delivery systems 32, 33 in accordance with an embodiment of the invention. Dual fuel generator 30 includes a dual fuel internal combustion engine 34 within housing 36 at one end 38, operatively connected to an alternator 40 also enclosed in housing 36 at another end 42 by conventional means. Dual fuel generator 30 is configured to operate on different fuels via either a first fuel source 44 or a second fuel source 46. In an exemplary embodiment of the invention, first fuel source 44 is a liquid fuel and second fuel source 46 is a gaseous fuel. In one preferred embodiment, the liquid fuel is gasoline and the gaseous fuel is liquid petroleum gas (LPG). An operator can selectively operate the generator on either fuel as desired. For instance, generator 30 may operate on gasoline for a first period of operation and then switch to LPG for a second period of operation. However, it is contemplated that dual fuel generator 30 is configured to operate on fuels other than gasoline and LPG (e.g., natural gas, biodiesel, etc.), and thus the scope of the invention is not meant to be limited strictly to a dual fuel arrangement where first fuel source 44 provides gasoline and second fuel source 46 provides LPG. In addition, embodiments of the invention contemplate tri-fuel, quad-fuel, and other multi-fuel arrangements.

In one embodiment of the invention, dual fuel generator 30 includes a gasoline tank 48 or, generally, a liquid fuel tank, located inside cover 36 onboard generator 30 to provide gasoline to the engine as first fuel source 44. Gasoline tank 48 connects to a first fuel line to provide gasoline to the carburetor to run the engine, as will later be described with reference to FIG. 2. Generator 30 is also coupled to a pressurized fuel container 50, or a pressurized fuel source, located off board generator 30 to provide LPG to the engine as second fuel source 46. Pressurized fuel container 50 is coupled to generator 30 with an LPG supply hose 52. LPG supply hose 52 is coupled to a second fuel line within generator 30 to provide LPG to the engine via the carburetor. Dual fuel generator 30 includes an electrical fuel switch 54 for selecting a desired fuel to the engine.

In an exemplary embodiment, fuel 46 from pressurized fuel container 50 is regulated using a fuel regulator system 56 for delivery to the engine. Fuel regulator system 56 includes one or more pressure regulators that reduce and control the pressure of the fuel from pressurized fuel container 50 and delivers fuel at a desired pressure for operation of the engine. Fuel regulator system 56 has an inlet 58 operatively coupled to a service valve 60 of pressurized fuel container 50 and an outlet 62 coupled to LPG supply hose 52. Fuel regulator system 56 includes a primary pressure regulator 64 coupled to pressurized fuel container 50 and a secondary pressure regulator 66. Primary pressure regulator 64 protects downstream components from high pressure of pressurized fuel container 50. Primary pressure regulator 64 receives LPG through service valve 60 of pressurized fuel container 50 and reduces the pressure of the LPG to a first stage. In one embodiment of the invention, the first stage may be delivered directly to generator 30 at a pressure required for operation of the engine.

In an exemplary embodiment of the invention, fuel regulator system 56 includes secondary pressure regulator 66 coupled to the outlet of primary pressure regulator 64 in order to use standard "off-the-shelf" components. Typically, the primary pressure regulator is mounted on the LPG tank, while the secondary pressure regulator is mounted on the component using the fuel, such as an engine or grill. Here, since generator 30 can be used as a gasoline only generator, secondary pressure regulator 66 is mounted off-board the generator to reduce size and cost of the generator. Secondary pressure regulator 66 receives LPG from primary pressure regulator 64 and further reduces the pressure of LPG to a second stage to be delivered to generator 30. In a system with two regulators, primary pressure regulator 64 regulates fuel received from pressurized fuel container 50 and reduces the pressure of the fuel to a level required for operation of secondary pressure regulator 66. Secondary pressure regulator 66 regulates fuel received from primary pressure regulator 64 and further reduces the pressure of the fuel to a level required for operation of generator 30. In addition, primary pressure regulator 64 may compensate for varying tank pressure as fuel is depleted while secondary pressure regulator 66 may compensate for varying demand from generator 30.

In accordance with an exemplary embodiment of the invention, fuel regulator system 56 includes both the primary and secondary regulators or a customized single regulator to perform both regulator functions in one, but in any case, in this embodiment, is located remotely, or off-board, from dual fuel generator 30. Fuel regulator system 56 may be directly mounted to pressurized fuel container 50 using a regulator mounting structure 68. Regulator mounting structure 68 is a device having mounting locations for primary pressure regulator 64 and secondary pressure regulator 66. Regulator mounting structure 68 also has a securing mechanism 70 to secure regulator mounting structure 68 to pressurized fuel container 50. The securing mechanism 70 is a cover or dome that sits on the container with an opening therein that fits around service valve 60.

In another embodiment of the invention, primary pressure regulator 64 is mounted on regulator mounting structure 68 while secondary pressure regulator 66 could be mounted on or near generator 30. In yet another embodiment of the invention, a dual stage regulator regulates the fuel received from pressurized fuel container 50 and delivers fuel at a pressure required for operation of generator 30. Such a dual stage regulator regulates the fuel to the second stage within a single structure and may comprise both the primary pressure regulator 64 and the secondary pressure regulator 66. The dual stage regulator may be mounted directly on fuel container 50. Pressurized fuel container 50 may be secured to a platform or mobile cart 72 for stability or transportation. In another embodiment, a regulator mounting structure 68 is secured directly to a platform or a mobile cart.

A quick-disconnect hose coupling 74, also referred to as a quick-connect hose coupling, connects LPG supply hose 52 to generator 30 so that LPG supply hose 52 may be quickly attached and detached from generator 30. Hose coupling 74 has a first end 74a mounted on the external surface of generator 30 and coupled to supply the second fuel to the engine. Hose coupling 74 has a second end 74b coupled to the outlet of LPG supply hose 52. Hose coupling 74 has a valve that opens when the couplings are engaged and closes when the couplings are disengaged. As such, quick-disconnect hose coupling 74 automatically opens when connected to enable fuel flow from LPG supply hose 52 to the engine. Hose coupling 74 automatically disconnects fluid communication when disconnected. Accordingly, when the supply hose is detached from generator 30, the coupling 74 is automatically closed so that fuel does not escape and unwanted air does not enter the fuel system.

Figure 2:
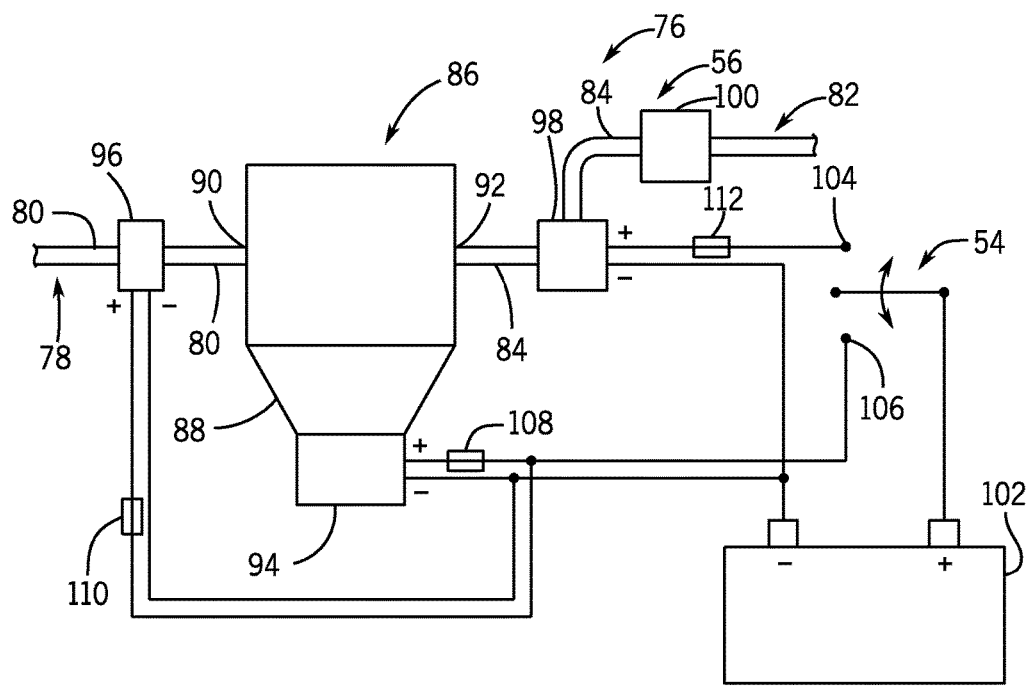
FIG. 2 is a schematic diagram of a fuel system for the multi-fuel generator of FIG. 1 configured in a bi-fuel arrangement, according to an embodiment of the invention.

Referring now to FIG. 2, a schematic diagram of a fuel system for the dual fuel generator is shown, in accordance with an embodiment of the invention. The fuel system includes an electro-mechanical valve system 76 that includes a carburetor cutoff solenoid 94, gasoline cutoff solenoid 96, and a LPG cutoff solenoid 98. The electro-mechanical valve system 76 is coupled to a multi-fuel internal combustion engine configured to operate on a liquid fuel supplied from a liquid fuel source 78 through a liquid fuel line 80, and a gaseous fuel supplied from a gaseous fuel source 82, or a pressurized fuel source, through a gaseous fuel line 84. Electro-mechanical valve system 76 is operated by electrical fuel switch 54 that controls fuel flow to the engine from liquid fuel source 78 and gaseous fuel source 82. In an exemplary embodiment of the invention, the dual fuel engine operates on gasoline from liquid fuel source 78 and LPG from gaseous fuel source 82.

In one embodiment of the invention, the engine has a carburetor 86 coupled to an intake of the engine to mix air and fuel and connect to liquid fuel line 80 and gaseous fuel line 84. Carburetor 86 has a mixing passage or throat with an inlet for air and an outlet for the air-fuel mixture. Carburetor 86 also has a float bowl 88 that receives liquid fuel through a liquid fuel inlet 90 coupled to liquid fuel line 80. Carburetor 86 may also have a gaseous fuel inlet 92 in the throat and coupled to gaseous fuel line 84. Gaseous fuel inlet 92 is preferably located upstream from a venturi in the throat for improved fuel and air mixing. Air is mixed with either of the fuels in the throat to provide the air-fuel mixture for operation of the engine. In another embodiment of the invention, a gaseous fuel mixer couples to the engine intake to mix gaseous fuel and air separately from carburetor 86.

In an exemplary embodiment of the invention, electro-mechanical valve system 76 includes a carburetor cutoff solenoid 94 coupled to carburetor 86 to control liquid fuel flow to the engine. Carburetor cutoff solenoid 94 operates to open and close a liquid fuel path to the engine downstream from float bowl 88 in carburetor 86. The liquid fuel path in carburetor 86 provides fuel to the throat from float bowl 88 and will later be described with reference to FIG. 4. The liquid fuel path may comprise a main fuel circuit within carburetor 86, and in some cases, also includes an idle fuel circuit within carburetor 86. Carburetor cutoff solenoid 94 cuts off liquid fuel flow through the liquid fuel path to provide a liquid fuel cutoff solenoid that controls fuel flow from liquid fuel line 80 to the engine.

Electro-mechanical valve system 76 may include a gasoline cutoff solenoid 96, or generally a liquid fuel cutoff solenoid, coupling liquid fuel source 78 to carburetor 86 and to control flow of the liquid fuel to carburetor 86. That is, gasoline cutoff solenoid 96 provides a liquid fuel valve coupled along liquid fuel line 80 to open and close liquid fuel source 78 to the engine. Electro-mechanical valve system 76 can operate with either or both the gasoline cutoff solenoid 96 and carburetor cutoff solenoid 94 to control liquid fuel flow to the engine. However, gasoline cutoff solenoid 96 is advantageous to quickly cut-off all liquid fuel flow to carburetor 86, and particularly, through the idle fuel circuit if carburetor cutoff solenoid 94 is regulating fuel through the main fuel circuit only. While limited fuel flow through the idle fuel circuit may not noticeably affect gaseous fuel operation, gasoline cutoff solenoid 96 prevents drawing gasoline through the idle fuel circuit after carburetor cutoff solenoid 94 closes the main fuel circuit.

Electro-mechanical valve system 76 may include an LPG cutoff solenoid 98, or generally a gaseous fuel cutoff solenoid, coupling gaseous fuel source 82 to the intake and to control flow of the gaseous fuel to the engine. LPG cutoff solenoid 98 provides a gaseous fuel valve coupled along gaseous fuel line 84 to open and close gaseous fuel source 82 to the engine. LPG cutoff solenoid 98 is preferably located downstream from fuel regulator system 56, shown in FIG. 2 as dual stage regulator 100, for a fast response in controlling gaseous fuel delivery to the engine.

Electro-mechanical valve system 76 also includes electrical switch 54 coupling a power source 102 to one or more of carburetor cutoff solenoid 94, gasoline cutoff solenoid 96 and LPG cutoff solenoid 98 to actuate the solenoids and provide a one-touch fuel selector to switch engine operation between fuels. Power source 102 is shown as a battery in FIG. 2, but could be from an engine driven power source, such as an alternator 40 (FIG. 1), a magneto, or any other suitable power supply. Switch 54 selectively powers solenoids 94, 96, 98 to engage liquid fuel operation when actuated to a first position and gaseous fuel operation when actuated to a second position. In an exemplary embodiment of the invention, switch 54 engages gasoline operation by closing LPG cutoff solenoid 98, opening gasoline cutoff solenoid 96, and operating carburetor cutoff solenoid 94 to open the main fuel circuit in the carburetor, and switch 54 engages LPG operation by closing gasoline cutoff solenoid 96, operating carburetor cutoff solenoid 94 to close the main fuel circuit, and opening LPG cutoff solenoid 98.

In an exemplary embodiment of the invention, gasoline cutoff solenoid 96, LPG cutoff solenoid 98, and carburetor cutoff solenoid 94 operate as normally closed solenoid valves to ensure excess fuel is not delivered to the engine if power to the solenoids is interrupted. To engage LPG operation, electrical fuel switch 54 provides electrical connection between power source 102 and a first contact 104 to power LPG cutoff solenoid 98 to open gaseous fuel line 84 while gasoline cutoff solenoid 96 and carburetor cutoff solenoid 94 are unpowered to close liquid fuel line 80 and the main fuel circuit in carburetor 86, respectively. To engage gasoline operation, electrical switch 54 provides electrical connection between power source 102 and a second contact 106 to power gasoline cutoff solenoid 96 and carburetor cutoff solenoid 94 to open liquid fuel line 80 and the main fuel circuit in carburetor 86, respectively, while LPG cutoff solenoid 98 is unpowered to close gaseous fuel line 84.

In an alternative embodiment of the invention, gasoline cutoff solenoid 96, LPG cutoff solenoid 98, and carburetor cutoff solenoid 94 operate as normally open solenoid valves to ensure fuel is provided to the engine if power to the solenoids is interrupted. To engage gasoline operation, switch 54 provides electrical connection between power source 102 and first contact 104 to power LPG cutoff solenoid 98 to close gaseous fuel line 84 while gasoline cutoff solenoid 96 and carburetor cutoff solenoid 94 are unpowered to open liquid fuel line 80 and the main fuel circuit in carburetor 86, respectively. To engage LPG operation, switch 54 provides electrical connection between power source 102 and second contact 106 to power gasoline cutoff solenoid 96 and carburetor cutoff solenoid 94 to close liquid fuel line 80 and the main fuel circuit in carburetor 86, respectively, while LPG cutoff solenoid 98 is unpowered to open gaseous fuel line 84.

Electro-mechanical valve system 76 can be configured to switch operation of the generator from multiple fuel sources while the generator is running, also referred to as "on-the-fly" fuel changeover. That is, switch 54 couples power source 102 to LPG cutoff solenoid 98 and one or more of the gasoline cutoff solenoid 96 and carburetor cutoff solenoid 94 to change operation of the engine from liquid fuel to gaseous fuel and from gaseous fuel to liquid fuel while the engine is running. Electro-mechanical valve system 76 provides for precisely timed fuel changeover between the fuel sources to switch engine operation with minimal or no interruption in the performance of the engine, and it can be timed to prevent or substantially prevent fuel overlap between the fuel sources.

To quickly start and stop liquid fuel delivery to the engine, carburetor cutoff solenoid 94 regulates fuel flow through a liquid fuel path downstream of float bowl 88. Carburetor cutoff solenoid 94 also traps enough gasoline in float bowl 88 to provide quick delivery of gasoline to the engine during changeover from LPG to gasoline to prevent any lag or hesitation in engine performance. During changeover from gasoline to LPG, carburetor cutoff solenoid 94 blocks fuel flow from float bowl 88 to the engine, thereby preventing an over-rich condition. That is, carburetor cutoff solenoid 94 can block gasoline remaining in float bowl 88 after gasoline cutoff solenoid 96 closes liquid fuel line 80 to prevent mixing gasoline with the LPG. Accordingly, carburetor cutoff solenoid 94 responds quickly upon actuation of switch 54 to limit fuel overlap and prevent overly rich fuel conditions that could adversely affect engine performance.

In addition, gasoline cutoff solenoid 96 may be opened to fill float bowl 88 with liquid fuel prior to switching engine operation to liquid fuel. That is, float bowl 88 will empty through the idle fuel circuit if carburetor cutoff solenoid 94 only blocks the main fuel circuit. Gasoline delivery to the engine during changeover is delayed if float bowl 88 must first be filled, and such delay could cause the engine to lose power or stall. Therefore, switch 54 may be configured to actuate gasoline cutoff solenoid 96 prior to actuating carburetor cutoff solenoid 94 to ensure adequate fuel in float bowl 88 for a smooth transition from LPG to gasoline.

In one embodiment of the invention, switch 54 actuates carburetor cutoff solenoid 94 and LPG cutoff solenoid 98 to change engine operation between the liquid fuel and the gaseous fuel so as to prevent fuel flow from liquid fuel source 78 and gaseous fuel source 82 simultaneously. In such an embodiment, electro-mechanical valve system 76 operates as a dual fuel lockout to ensure only one fuel is delivered to the engine. Switch 54 may simultaneously actuate carburetor cutoff solenoid 94 and LPG cutoff solenoid 98 to prevent or substantially prevent simultaneous fuel delivery of the liquid fuel and the gaseous fuel to the engine. In other embodiments, switch 54 actuates any of solenoids 94, 96, 98 in succession to prevent or substantially prevent simultaneous fuel delivery of the liquid fuel and the gaseous fuel to the engine. As such, switch 54 can operate the electro-mechanical valve system 76 to prevent an overly rich air-fuel ratio during cross-over switching between fuel sources, even while operating at full load.

In another embodiment of the invention, electro-mechanical valve system 76 provides a slight overlap in fuel delivery to the engine to ensure a smooth transition during changeover. Carburetor cutoff solenoid 94 may close the liquid fuel path in carburetor 86 after LPG cutoff solenoid 98 opens to ensure fuel flow to the engine is not interrupted during changeover from gasoline to LPG. LPG cutoff solenoid 98 may close after carburetor cutoff solenoid 94 opens the liquid fuel path in carburetor 86 to ensure fuel flow to the engine is not interrupted during changeover from LPG to gasoline. Accordingly, switch 54 may actuate LPG cutoff solenoid 98 and carburetor cutoff solenoid 94 in succession to provide fuel overlap when changing engine operation between the liquid fuel and the gaseous fuel. Electro-mechanical valve system 76 can also be configured to provide blended fuel operation, if so desired.

Switch 54 can institute a predefined delay between actuating any of gasoline cutoff solenoid 96, carburetor cutoff solenoid 94, and LPG cutoff solenoid 98. Adjustable rheostats or predefined electronic delay circuits 108, 110, 112 can be coupled to the electrical connections of any of solenoids 94, 96, 98 to delay their actuation. As such, any of solenoids 96, 94, 98 may be configured to operate according to a user adjustable preset delay to actuate one or more of the solenoids in succession. In some embodiments of the invention, electronic delay circuits 108, 110, 112 provide simultaneous delivery of fuels to the engine for any fraction of a second or for up to several seconds.

Electro-mechanical valve system 76 can also change engine operation between fuel sources on-the-fly without gasoline cutoff solenoid 96 regulating fuel through liquid fuel line 80. In such an embodiment, upon actuation of switch 54 from gaseous fuel to liquid fuel, carburetor cutoff solenoid 94 can open a liquid fuel path in the carburetor to engage engine operation on liquid fuel and LPG cutoff solenoid 98 can actuate to stop engine operation on gaseous fuel. Also, upon actuation of switch 54 from liquid fuel to gaseous fuel, LPG cutoff solenoid 98 can open the gaseous fuel line 84 to engage engine operation on gaseous fuel and carburetor cutoff solenoid 94 can actuate to stop engine operation on liquid fuel.

Alternatively, electro-mechanical valve system 76 can change engine operation between fuel sources on-the-fly without carburetor cutoff solenoid 94. In such an embodiment, gasoline cutoff solenoid 96 can open the liquid fuel line 80 to engage engine operation on liquid fuel upon actuation of switch 54 from gaseous fuel to liquid fuel, and gasoline cutoff solenoid 96 can stop engine operation on liquid fuel upon actuation of switch 54 from liquid fuel to gaseous fuel. Further, gasoline cutoff solenoid 96 and LPG cutoff solenoid 98 can be precisely timed to limit or prevent fuel overlap during changeover without interrupting engine performance. For instance, gasoline cutoff solenoid 96 may be opened prior to closing LPG cutoff solenoid 98 to ensure adequate fuel in float bowl 88 for on-the-fly changeover. Also, gasoline cutoff solenoid 96 may be closed before LPG cutoff solenoid 98 is opened to reduce fuel in float bowl 88 and limit fuel overlap during on-the-fly changeover. Accordingly, switch 54 may be precisely timed to operate gasoline cutoff solenoid 96 and LPG cutoff solenoid 98 to prevent, or substantially prevent, simultaneous fuel delivery of the liquid fuel and the gaseous fuel to the engine.

Figure 3:
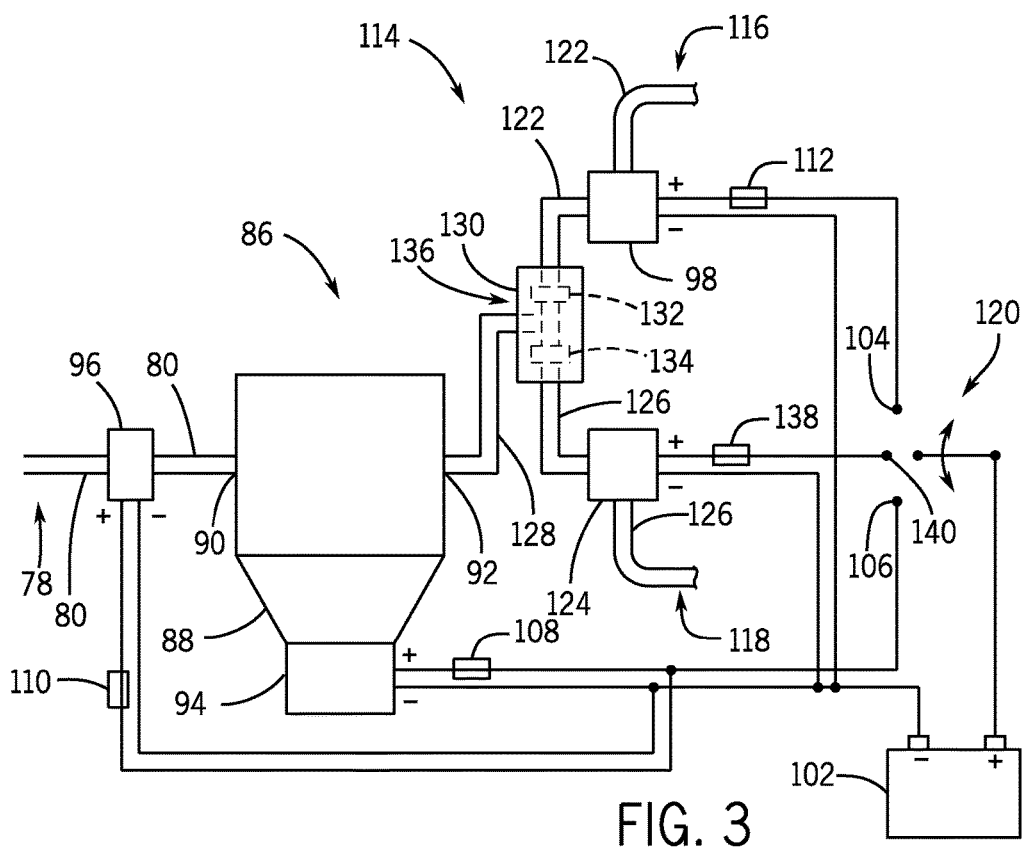
FIG. 3 is a schematic diagram of a fuel system for the multi-fuel generator of FIG. 1 to operate in a tri-fuel arrangement, according to an embodiment of the invention.

Referring now to FIG. 3, a schematic diagram of a fuel system to operate the generator in a tri-fuel arrangement is shown, in accordance with an embodiment of the invention. The fuel system includes an electro-mechanical valve system 114 coupled to a multi-fuel internal combustion engine configured to operate on a liquid fuel supplied from a liquid fuel source 78 and first and second gaseous fuels supplied from a respective first gaseous fuel source 116 and second gaseous fuel source 118. Electro-mechanical valve system 114 is operated by a tri-fuel electrical switch 120 that controls fuel flow to the engine from liquid fuel source 78 and gaseous fuel sources 116, 118. In an exemplary embodiment of the invention, the multi-fuel engine operates on gasoline from liquid fuel source 78, liquid petroleum gas (LPG) from first gaseous fuel source 116, and natural gas (NG) from second gaseous fuel source 118.

Electro-mechanical valve system 114 may include gasoline cutoff solenoid 96 to open and close a liquid fuel path through liquid fuel line 80 to carburetor 86, a carburetor cutoff solenoid 94 to control liquid fuel flow through the carburetor, and LPG cutoff solenoid 98 to open and close a gaseous fuel path for the first gaseous fuel through LPG line 122 to the engine. Electro-mechanical valve system 114 may also include an NG cutoff solenoid 124, or generally a gaseous fuel cutoff solenoid, to couple the engine intake to second gaseous fuel source 118 and to control flow of the second gaseous fuel to the engine. NG cutoff solenoid 124 provides a gaseous fuel valve coupled along an NG line 126 to open and close second gaseous fuel source 118 to the engine. That is, NG cutoff solenoid 124 operates to open and close a gaseous fuel path for the second gaseous fuel through NG line 126 to the engine.

In an exemplary embodiment of the invention, a gaseous fuel line 128 provides NG and LPG to the engine by coupling to carburetor 86 and to both gaseous fuel sources 116, 118. A jet block 130 may be used to couple gaseous fuel line 128 to LPG line 122 and NG line 126. In one embodiment of the invention, jet block 130 is a 2-way branched fitting coupling first gaseous fuel source 116 and second gaseous fuel source 118 to carburetor 86 and located downstream from LPG cutoff solenoid 98 and NG cutoff solenoid 124. Jet block 130 may also comprise a first gaseous fuel jet 132 sized for the first gaseous fuel coupled to the first gaseous fuel source 116, and a second gaseous fuel jet 134 sized for the second gaseous fuel coupled to the second gaseous fuel source 118. The gaseous fuel jets 132, 134 comprise gaseous fuel main jets sized to meter the respective fuels as desired for a particular engine, or based on desired performance for each fuel in a given application. Jet block 130 has an outlet port 136 coupled to gaseous fuel line 128 to provide fuel from first gaseous fuel jet 132 and second gaseous fuel jet 134 to the engine.

Jet block 130 may be used to modify a dual fuel internal combustion engine into a tri-fuel engine by coupling a second gaseous fuel source to the engine intake. Jet block 130 can incorporate more than two gaseous fuel jets to couple additional gaseous fuel lines to carburetor 86. Each fuel line has a gaseous fuel valve to open and close the line. A fuel switch is wired appropriately to operate the additional solenoids. As such, jet block 130 allows a dual fuel engine to operate as a tri-fuel engine, quad-fuel engine or to operate with additional fuel sources.

Electro-mechanical valve system 114 includes a tri-fuel switch 120 coupling power source 102 to any of gasoline cutoff solenoid 96, LPG cutoff solenoid 98, NG cutoff solenoid 124, and carburetor cutoff solenoid 94 to selectively operate the solenoids and engage gasoline operation when actuated to a first position, engage LPG operation when actuated to a second position, and engage NG operation when actuated to a third position. When tri-fuel switch 120 engages engine operation on one of the fuels, it may also stop delivery of the remaining fuels to the engine. As such, solenoids 94, 96, 98, 124 engage engine operation on their respective fuel source upon selection of the tri-fuel switch 120 to the respective fuel source, and the solenoids 94, 96, 98, 124 stop engine operation on their respective fuel source upon selection of the switch to another fuel source.

Electro-mechanical valve system 114 can be configured to switch operation of the generator from any single fuel to any other single fuel from first gaseous fuel source 116, second gaseous fuel source 118, and liquid fuel source 78 on-the-fly while the engine is running. For instance, tri-fuel switch 120 can actuate any combination of the carburetor cutoff solenoid 94, LPG cutoff solenoid 98, NG cutoff solenoid 124 and gasoline cutoff solenoid 96 to change operation of the engine among the liquid fuel, the first gaseous fuel, and the second gaseous fuel while the engine remains running. Electro-mechanical valve system 114 provides for precisely timed fuel changeover to switch engine operation among fuel sources with minimal or no interruption in the performance of the engine, and it can be timed to prevent or substantially prevent fuel overlap between the fuel sources.

To change between gaseous fuel and liquid fuel, tri-fuel switch 120 may operate NG cutoff solenoid 124 for NG and LPG cutoff solenoid 98 for LPG corresponding to the description of switch 54 operating LPG cutoff solenoid 98 with respect to FIG. 2. Referring back to FIG. 3, to switch between first gaseous fuel source 116 and second gaseous fuel source 118, tri-fuel switch 120 may simultaneously actuate LPG cutoff solenoid 98 and NG cutoff solenoid 124 to prevent or substantially prevent simultaneous fuel delivery of first gaseous fuel source 116 and second gaseous fuel source 118 to the engine. As such, electro-mechanical valve system 114 can operate as a tri-fuel lockout to ensure only one fuel is delivered to the engine. In other embodiments, tri-fuel switch 120 actuates the NG cutoff solenoid 124 and LPG cutoff solenoid 98 in succession to ensure appropriately timed on-the-fly fuel changeover between the two gaseous fuels. Adjustable rheostats or predefined electronic delay circuits 108, 110, 112, 138, may be coupled to the electrical connections of any of solenoids 94, 96, 98, 124, to delay their actuation.

In one embodiment of the invention, solenoids 98, 124, 94, 96 operate as normally closed solenoid valves to ensure excess fuel is not provided to the engine if power to the solenoids is interrupted. To engage LPG operation, tri-fuel switch 120 provides electrical connection between power source 102 and first contact 104 to power LPG cutoff solenoid 98 to open LPG line 122 while gasoline cutoff solenoid 96, carburetor cutoff solenoid 94, and NG cutoff solenoid 124 are unpowered to close liquid fuel line 80, the main fuel circuit in carburetor 86, and NG line 126, respectively. To engage gasoline operation, tri-fuel switch 120 provides electrical connection between power source 102 and second contact 106 to power gasoline cutoff solenoid 96 and carburetor cutoff solenoid 94 to open liquid fuel line 80 and the main fuel circuit in carburetor 86 while LPG cutoff solenoid 98 and NG cutoff solenoid 124 are unpowered to close LPG line 122 and NG line 126, respectively. To engage NG operation, tri-fuel switch 120 provides electrical connection between power source 102 and a third contact 140 to power NG cutoff solenoid 124 to open NG line 126 while gasoline cutoff solenoid 96, carburetor cutoff solenoid 94 and LPG cutoff solenoid 98 are unpowered to close liquid fuel line 80, the main fuel circuit in carburetor 86, and LPG line 122, respectively.

In an alternative embodiment of the invention, solenoids 98, 124, 94, 96 operate as normally open solenoid valves to ensure fuel is provided to the engine if power to the solenoids is interrupted. To engage LPG operation, tri-fuel switch 120 provides electrical connection between power source 102 and both second contact 106 and third contact 140 to power gasoline cutoff solenoid 96, carburetor cutoff solenoid 94, and NG cutoff solenoid 124 to close liquid fuel line 80, main fuel circuit in carburetor 86, and NG line 126, respectively, while LPG cutoff solenoid 98 is unpowered to open LPG line 122. To engage gasoline operation, tri-fuel switch 120 provides electrical connection between power source 102 and both first contact 104 and third contact 140 to power LPG cutoff solenoid 98 and NG cutoff solenoid 124 to close LPG line 122 and NG line 126 while gasoline cutoff solenoid 96 and carburetor cutoff solenoid 94 are unpowered to open liquid fuel line 80 and the main fuel circuit in carburetor 86, respectively. To engage NG operation, tri-fuel switch 120 provides electrical connection between power source 102 and both first contact 104 and second contact 106 to power gasoline cutoff solenoid 96, carburetor cutoff solenoid 94, and LPG cutoff solenoid 98 to close liquid fuel line 80, main fuel circuit in carburetor 86, and LPG line 122, respectively, while NG cutoff solenoid 124 is unpowered to open NG line 126.

Figure 4:
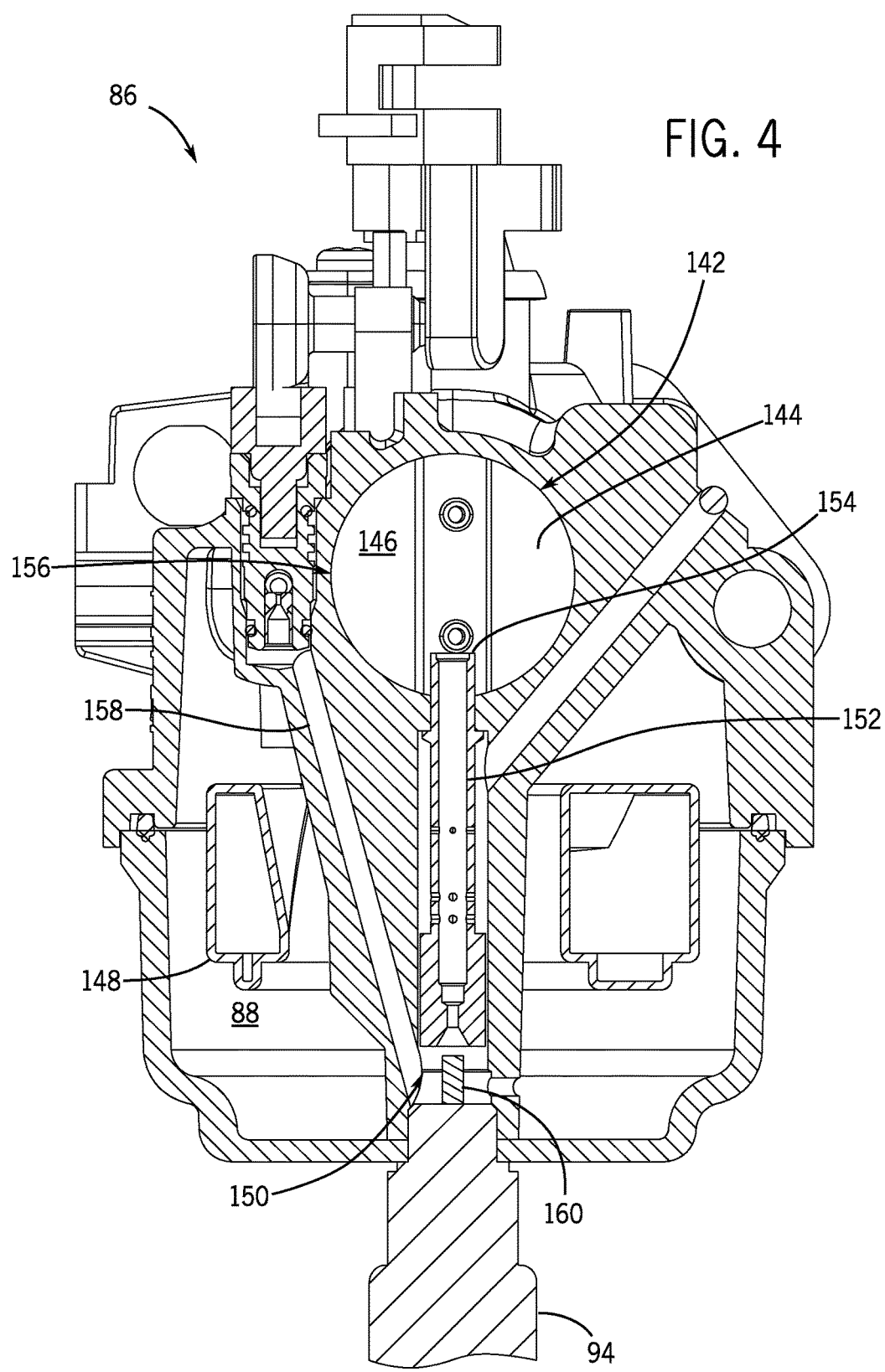
FIG. 4 is a cross-sectional view of a carburetor for the multi-fuel generator of FIG. 1 taken transverse to a throat of the carburetor and through a fuel passage that provides fuel from a float bowl to the throat of the carburetor, according to an embodiment of the invention.

Referring now to FIG. 4, a cross-sectional view of carburetor 86 taken transverse to a barrel or throat 142 of the carburetor is shown, in accordance with an embodiment of the invention. Fuel and air are mixed in throat 142 to provide an air-fuel mixture for the multi-fuel internal combustion engine. A butterfly valve 144 is located in throat 142 to provide a choke and throttle 146 for the engine. Carburetor 86 has a float bowl 88 to hold liquid fuel with a float valve 148 to control the fuel level in the bowl. Carburetor 86 has a liquid fuel path 150 from float bowl 88 to throat 142. Liquid fuel path 150 is shown in FIG. 4 referring to main fuel circuit 152 in carburetor 86, but may also include other fuel circuits in the carburetor. Main fuel circuit 152 provides a flow path from float bowl 88 to a nozzle 154 in a venturi 156 upstream from throttle 146. An idle fuel circuit 158 provides a flow path to the throat 142 downstream of throttle 146 to run the engine at idle.

In one embodiment of the invention, carburetor 86 has a carburetor cutoff solenoid 94 coupled to carburetor 86 to regulate liquid fuel flow to the engine. Carburetor cutoff solenoid 94 actuates to open and close liquid fuel path 150 to the engine downstream from float bowl 88. Carburetor cutoff solenoid 94 has an actuating member 160 that moves to selectively block fuel flow through liquid fuel path 150, comprising main fuel circuit 152, and may be positioned to selectively block fuel flow into the inlet of main fuel circuit 152. Gasoline cutoff solenoid 96 (FIG. 2) closes off the liquid fuel line to carburetor 86 and fuel flowing through idle fuel circuit 158 stops when float bowl 88 empties. In another embodiment of the invention, carburetor cutoff solenoid 94 is configured to control fuel flow through both main fuel circuit 152 and idle fuel circuit 158. For instance, idle fuel circuit 158 may branch off from main fuel circuit 152 with carburetor cutoff solenoid 94 actuating to block fuel flow into both circuits.

Figure 5:
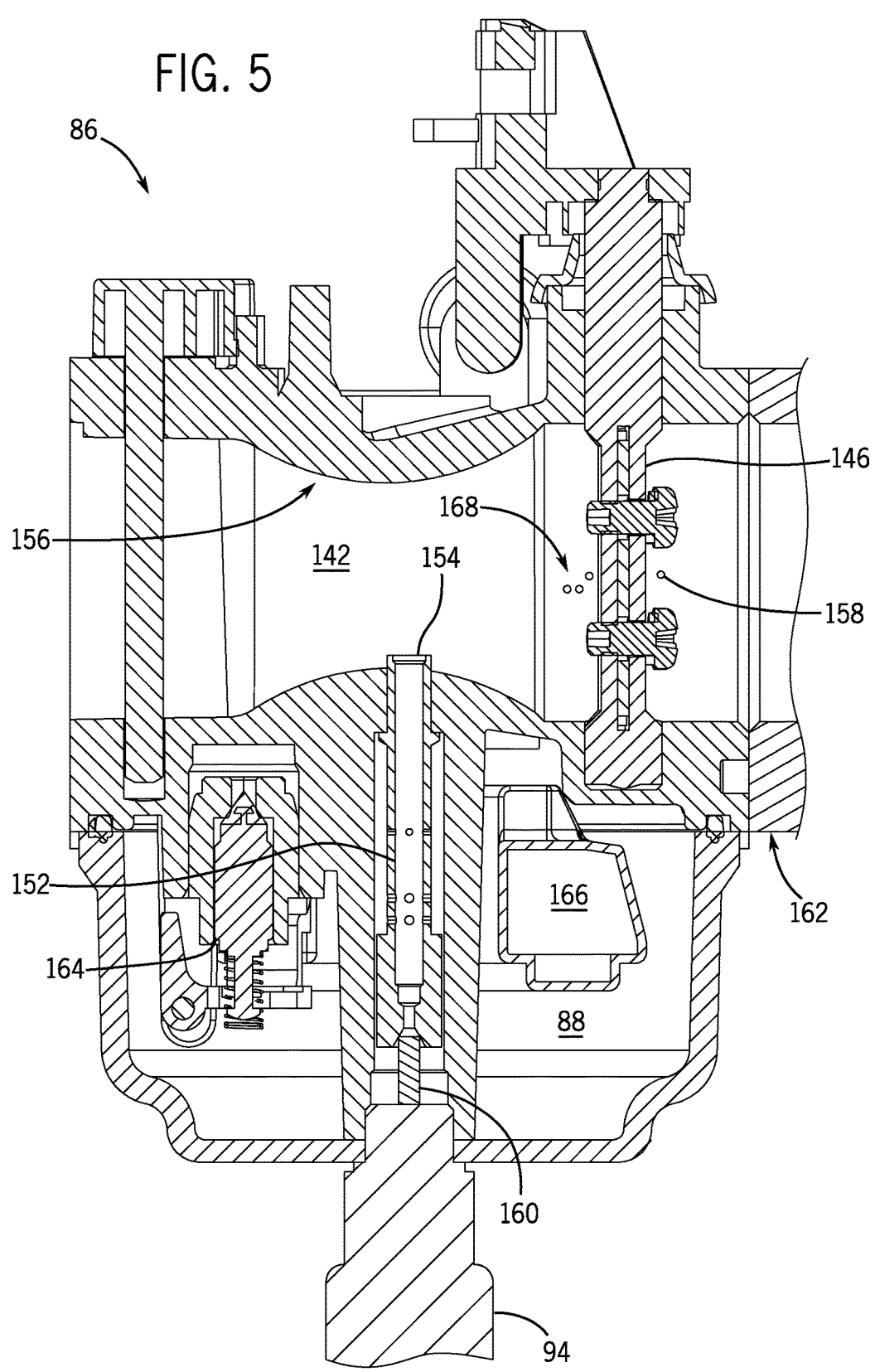
FIG. 5 is a cross-sectional view of the carburetor of FIG. 4 coupled to an engine intake taken lengthwise to the throat and through the fuel passage, according to an embodiment of the invention.

Referring now to FIG. 5, a cross-sectional view of carburetor 86 is shown taken lengthwise to throat 142, in accordance with an embodiment of the invention. Carburetor 86 is attached to the engine at engine intake 162 to supply a metered mixture of air and fuel and connect a liquid fuel source to the intake. Throat 142 includes venturi 156 and throttle 146 located downstream from venturi 156. A float bowl 88 and a float 166 control and maintain the fuel level in the bowl from an inlet valve 164. Main fuel circuit 152 provides a flow path from float bowl 88 to nozzle 154 in a narrow portion of venturi 156. Idle fuel circuit 158 provides a flow path from float bowl 88 to throat 142 downstream of throttle 146. Transition fuel circuit 168 provides a flow path to throat 142 upstream from throttle 146 and branches off from idle fuel circuit 158. Transition fuel circuit 168 is opened to vacuum conditions as the throttle 146 moves slightly from a closed position to provide additional fuel as the engine transitions from idle.

Carburetor cutoff solenoid 94 couples to float bowl 88 to selectively control liquid fuel flow through main fuel circuit 152. Carburetor cutoff solenoid 94 includes actuating member 160 capable of blocking fuel flow through main fuel circuit 152 when actuated. FIG. 5 shows actuating member 160 in an extended or blocking position, while FIG. 4 shows actuating member 160 in a retracted or open position. Carburetor cutoff solenoid 94 actuates to quickly start and stop liquid fuel flow from float bowl 88 to the engine through main fuel circuit 152 to provide precisely timed engine changeover between liquid and gaseous fuel sources.

Beneficially, embodiments of the invention thus provide for a multi-fuel internal combustion engine capable of switching between liquid fuel and gaseous fuel sources while the engine is running. Embodiments of the invention also provide for a multi-fuel internal combustion engine having a fuel system to prevent an overly rich air-fuel ratio during cross-over switching between fuel sources. Embodiments of the invention also provide for a multi-fuel generator with a remotely mounted gaseous fuel pressure regulator system.

Therefore, according to one embodiment of the invention, a multi-fuel engine includes an engine operable on a liquid fuel and a gaseous fuel. The multi-fuel engine also includes a liquid cutoff solenoid coupled to open and close a liquid fuel path to the engine, and a gaseous cutoff solenoid coupled to open and close a gaseous fuel source to the engine. A switch couples a power source to the liquid cutoff solenoid and the gaseous cutoff solenoid to switch between fuel sources on-the-fly during engine operation.

According to another embodiment of the invention, a multi-fuel generator and fuel delivery system includes a multi-fuel internal combustion engine configured to operate on a liquid fuel supplied from a liquid fuel source through a liquid fuel line and a gaseous fuel supplied from a pressurized fuel source through a gaseous fuel line, and further includes an alternator driven by the multi-fuel internal combustion engine. The multi-fuel generator and fuel delivery system also has a fuel regulator system and an electro-mechanical valve system. The fuel regulator system includes a primary pressure regulator coupled to a service valve of the pressurized fuel source to regulate fuel supplied from the pressurized fuel source to a reduced pressure, and a secondary pressure regulator coupled to the primary pressure regulator to regulate fuel supplied from the primary pressure regulator to a desired pressure for delivery through the gaseous fuel line to operate the engine. The electro-mechanical valve system couples to the engine and operates by an electrical switch powered by one of the alternator, a battery, and a magneto to control fuel flow to the engine from the liquid fuel source and the pressurized fuel source.

According to yet another embodiment of the invention, a multi-fuel internal combustion engine includes an engine operable on liquid fuel supplied through a liquid fuel line from a liquid fuel source and gaseous fuel supplied through a gaseous fuel line from a pressurized fuel source, and a switch to change operation of the engine from liquid fuel to gaseous fuel and from gaseous fuel to liquid fuel while the engine is running. A liquid fuel cutoff solenoid couples to control fuel flow through the liquid fuel line and engage engine operation on liquid fuel upon actuation of the switch from gaseous fuel to liquid fuel, and a gaseous fuel cutoff solenoid couples to control fuel flow through the gaseous fuel line and engage engine operation on gaseous fuel upon actuation of the switch from liquid fuel to gaseous fuel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-fuel engine comprising:
   an engine operable on a liquid fuel and a gaseous fuel;
   a carburetor attached to an intake of the engine to mix air and fuel and connect a liquid fuel source to the intake, the carburetor comprising a float bowl;
   a liquid cutoff solenoid coupled to the carburetor to open and close a liquid fuel path to the engine downstream from the float bowl;
   a gaseous cutoff coupled to open and close a gaseous fuel source to the engine; and
   a switch selectively coupling a power source to the liquid cutoff solenoid to open and close the liquid fuel path.

2. The multi-fuel engine of claim 1; and
   wherein the liquid cutoff solenoid is positioned on the liquid fuel path, which extends from the float bowl to a throat of the carburetor, to open and close the liquid fuel path; and
   further wherein the gaseous cutoff solenoid couples the gaseous fuel source to the intake to control flow of the gaseous fuel to the engine.

3. The multi-fuel engine of claim 1 wherein the switch actuates the liquid cutoff solenoid to enable changing engine operation between the liquid fuel and the gaseous fuel, so as to prevent fuel flow from the liquid fuel source and the gaseous fuel source simultaneously and allow switching between fuel sources on-the-fly during engine operation.

4. The multi-fuel engine of claim 1 wherein the switch actuates the liquid cutoff solenoid to provide fuel overlap when changing engine operation between the liquid fuel and the gaseous fuel.

5. The multi-fuel engine of claim 1 wherein the engine is a dual fuel engine that operates on gasoline from the liquid fuel source and LPG from the gaseous fuel source.

6. The multi-fuel engine of claim 1 wherein activating the gaseous cutoff simultaneously activates the liquid cutoff solenoid.

7. The multi-fuel engine of claim 1 wherein the liquid cutoff solenoid is selectively operable to cut off fuel flow from the float bowl to a nozzle in a venturi of the carburetor upstream from a throttle for the engine.

8. The multi-fuel engine of claim 1 wherein the carburetor connects the gaseous fuel source to the intake.

9. The multi-fuel engine of claim 1 further comprising a liquid fuel valve positioned on a liquid fuel line coupling the liquid fuel source to the carburetor to open and close the liquid fuel source to the engine.

10. The multi-fuel engine of claim 9 wherein the switch opens the liquid fuel valve to fill the float bowl with liquid fuel prior to actuating the liquid cutoff solenoid to open the liquid fuel path.

11. A multi-fuel generator and fuel delivery system comprising:
    a multi-fuel internal combustion engine configured to operate on a liquid fuel supplied from a liquid fuel source through a liquid fuel line and a gaseous fuel supplied from a pressurized fuel source through a gaseous fuel line;
    an alternator driven by the multi-fuel internal combustion engine;
    a fuel regulator system comprising:
       a primary pressure regulator coupled to a service valve of the pressurized fuel source to regulate fuel supplied from the pressurized fuel source to a reduced pressure, and
       a secondary pressure regulator coupled to the primary pressure regulator to regulate fuel supplied from the primary pressure regulator to a desired pressure for delivery through the gaseous fuel line to operate the engine; and
    an electro-mechanical valve system coupled to the engine and operated by an electrical switch powered by one of the alternator, a battery, and a magneto that controls fuel flow to the engine from the liquid fuel source and the pressurized fuel source.

12. The multi-fuel generator and fuel delivery system of claim 11 wherein the electro-mechanical valve system is configured to switch operation of the generator from multiple fuel sources while the generator is running.

13. The multi-fuel generator and fuel delivery system of claim 11 wherein the electro-mechanical valve system is configured to prevent simultaneous delivery of the liquid fuel and the gaseous fuel to the engine.

14. The multi-fuel generator and fuel delivery system of claim 11 wherein the electro-mechanical valve system comprises:
    a carburetor cutoff solenoid coupled to a carburetor to control liquid fuel flow to the engine, and
    a gaseous fuel cutoff solenoid coupled to the gaseous fuel line to control flow of the gaseous fuel to the engine.

15. The multi-fuel generator and fuel delivery system of claim 14 further comprising a liquid fuel cutoff solenoid coupled to the liquid fuel line to control flow of the liquid fuel to the carburetor.

16. The multi-fuel generator and fuel delivery system of claim 11 wherein the pressurized fuel source comprises a pressurized fuel container located off-board the generator having a regulator mounting device to secure at least the secondary pressure regulator thereto.

17. The multi-fuel generator and fuel delivery system of claim 11 wherein a dual stage pressure regulator comprises the primary pressure regulator and the secondary pressure regulator.

18. A multi-fuel internal combustion engine comprising:
an engine operable on liquid fuel supplied through a liquid fuel line from a liquid fuel source and gaseous fuel supplied through a gaseous fuel line from a pressurized fuel source;
a carburetor coupled to an intake of the engine to mix air and fuel and connect to the liquid fuel line and the gaseous fuel line;
a carburetor cutoff solenoid coupled to control fuel flow within the carburetor from the liquid fuel line and selectively engage engine operation on liquid fuel; and
a gaseous fuel valve coupled to control fuel flow through the gaseous fuel line and selectively engage engine operation on gaseous fuel.

19. The multi-fuel internal combustion engine of claim 18 wherein the gaseous fuel valve comprises a gaseous fuel cutoff solenoid.

20. The multi-fuel internal combustion engine of claim 19 further comprising a switch to change operation of the engine from liquid fuel to gaseous fuel and from gaseous fuel to liquid fuel while the engine is running.

21. The multi-fuel internal combustion engine of claim 20 wherein the switch institutes a predefined delay between actuating the carburetor cutoff solenoid and the gaseous fuel cutoff solenoid.

22. The multi-fuel internal combustion engine of claim 20 wherein the switch operates the carburetor cutoff solenoid and the gaseous fuel cutoff solenoid to substantially prevent simultaneous fuel delivery of the liquid fuel and the gaseous fuel to the engine.

23. The multi-fuel internal combustion engine of claim 20 wherein the gaseous fuel cutoff solenoid and the carburetor cutoff solenoid operate as normally closed solenoid valves.

24. The multi-fuel internal combustion engine of claim 18 further comprising:
an alternator driven by the engine to form a generator; and
a fuel regulator system located off-board the generator and comprising:
a primary pressure regulator coupled to a service valve of the pressurized fuel source to regulate the fuel supplied from the pressurized fuel source to a reduced pressure, and
a secondary pressure regulator coupled to the primary pressure regulator to regulate the gaseous fuel supplied from the primary pressure regulator to a desired pressure for delivery through the gaseous fuel line to operate the engine.

\* \* \* \* \*

UNITED STATES PATENT AND TRADEMARK OFFICE
CERTIFICATE OF CORRECTION

PATENT NO. : 10,393,034 B2
APPLICATION NO. : 15/285215
DATED : August 27, 2019
INVENTOR(S) : Collie et al.

Page 1 of 1

It is certified that error appears in the above-identified patent and that said Letters Patent is hereby corrected as shown below:

In the Claims

Column 13, Line 47 (Claim 2), delete "claim 1; and" and substitute therefore -- claim 1 --; and Column 13, Line 52 (Claim 2), delete "cutoff solenoid couples" and substitute therefore -- cutoff couples --.

Signed and Sealed this
Seventh Day of January, 2020

Andrei Iancu
*Director of the United States Patent and Trademark Office*